Patented Feb. 10, 1953

2,628,217

UNITED STATES PATENT OFFICE 2,628,217

PROCESS FOR PREPARING AMIDES

Eugene Edward Magat, Wilmington, Del., assignor to E. I. du Pont de Nemours & Company, Wilmington, Del., a corporation of Delaware No Drawing. Application January 25, 1949, Serial No. 72,772

9 Claims. (Cl. 260—78)

This invention relates to the manufacture of amido compounds and more particularly to a novel process for preparing amides containing a tertiary carbon atom attached to an amido nitrogen.

Certain N-secondary and N-tertiary alkyl amides have been prepared heretofore, for example N-tertiary butyl acetamide has been prepared by treating pinacoline oxime with PCl5 in ether solution [Scholl, Ann. 338, 16 (1905)]. In general, the methods which have been employed previously for the preparation of N-tertiary alkyl amides have been unattractive from an economic standpoint and for this reason, among others, these compounds have not been heretofore available in commercial quantities.

An object of this invention therefore is to provide a simple, economical and commercially feasible process for preparing amido compounds containing a tertiary carbon atom attached to the nitrogen of an amide group.

Another object is to prepare synthetic linear polyamides by a polymerization reaction carried out at relatively low temperature in contradistinction to the high temperatures (180–300° C.) and, hence, expensive polymerization reaction required to form these linear polyamides by the process heretofore known to the art.

These and other objects will more clearly appear hereinafter.

The above objects are realized by this invention, which comprises reacting an organic nitrile with, preferably, a substantially equivalent amount of a tertiary alkyl chloride in the presence of a strong acid and water. After the reaction has proceeded for a length of time sufficient to obtain a satisfactory yield, an amide of the general formula:

R—CONH—R' is formed, wherein R is the organic radical from the nitrile and R' is a tertiary alkyl radical from the tertiary alkyl chloride. The resulting amide may be easily isolated by pouring the reaction mixture into water followed by filtration.

The following series of reactions wherein, by way of example, tertiary butyl chloride, benzonitrile and water are reacted in the presence of sulfuric acid, illustrate a theoretical concept of the mechanism of the reaction involved in the process of this invention:

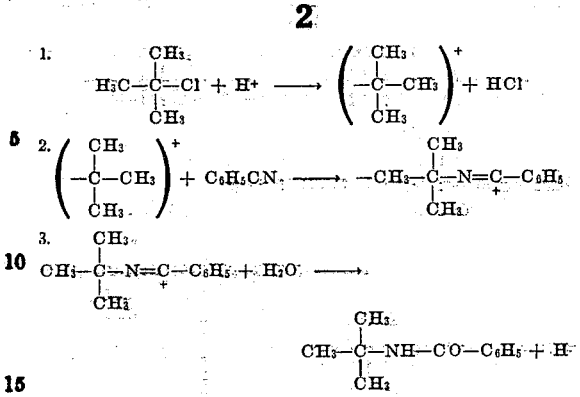

The process of this invention is applicable to all nitriles and dinitriles. The operable nitriles may be formulated as R—CN, in which R is an organic radical free of reacting groups, or hydrogen. This radical may be aliphatic, aromatic, cyclic, alicyclic, saturated, unsubstituted or substituted by groups which do not interfere with the amidation reaction. As suitable examples of such nitriles may be mentioned hydrogen cyanide, acetonitrile, butyronitrile, valeronitrile, dodecylcyanide, etc. The dinitriles may be formulated as NC—R—CN, in which R is a bivalent organic radical free of reacting groups or is non-existent, e. g. cyanogen. The bivalent radical joining the nitrile groups, as in the case of the mononitriles, may be aliphatic, aromatic, cyclic or heterocyclic, saturated or unsaturated and may be unsubstituted or substituted by non-reacting groups, i. e., groups which do not interfere with the amidation reaction. The dinitrile may contain alcohol and thiol unreactive groups, for example primary ether, sulfide, ketone, ester of a primary alcohol, amide, halogen and the like. Specific suitable dinitriles are the following: succinonitrile, glutaronitrile, adiponitrile, pimelonitrile, suberonitrile, azelonitrile, sebaconitrile, isophthalonitrile, phthalonitrile, hexahydroterephthalonitrile, β-phenyladiponitrile, β-methyladiponitrile, 3-nitrophthalonitrile, α-amino-adiponitrile, 1,4-dicyanobutene-2 and the like.

Likewise all tertiary alkyl chlorides are reactive with mono- or difunctional nitriles to form amides having one or two amide groupings in accordance with the principles of this invention. Examples of such tertiary alkyl chlorides are tertiary butyl chloride, 2-methyl-5-methyl-5-chlorohexane, 2-chloro-2-methyl pentane, tertiary amyl chloride, 3-chloro-3-ethyl pentane.

The above specifically named tertiary alkyl chlorides are useful with mono- or dinitriles to produce amides having one or two amide linkages. However, if it is desired to prepare a molecule having a multiplicity of amide linkages, e. g., a synthetic linear polyamide, it is necessary to use a ditertiary alkylene dichloride in conjunction with a dinitrile. Representative ditertiary alkyl dichlorides that may be used in preparing synthetic linear polyamides are, 2,7-dichloro-2,7-dimethyl octane, 3,8-dichloro-3,8-diethyl decane, 4,9-dichloro-4,9-dipropyl dodecane, 2,10-dichloro-2,10-dimethyl undecane, 3,11-dichloro-3,11-diethyl tridecane, 2,11-dichloro-2,11-dimethyl dodecane, 3,12-dichloro-3,12-diethyl tetradecane, and 4,13-dichloro-4,13-dipropyl hexadecane.

As an alternative group of related reactants suitable for making polyamides there may also be mentioned the cyanochlorides. Here again it is necessary that the alkyl chloride present be tertiary. With this class of reactant a self-condensation occurs under the conditions of the process of this invention and a polyamide is formed. As some examples of suitable cyanochlorides the following are representative:

2-chloro-2-methyl-6-cyanohexane
2-chloro-2-methyl-9-cyanononane
3-chloro-3-methyl-8-cyanoctane
p-(3-chloro-3-methyl-butyl) benzonitrile
2-chloro-2-methyl-7-cyano-5-oxaheptane If desired an intermediate may be formed under anhydrous conditions and then hydrolyzed to form the amides. For example, 100% or slightly fuming sulfuric acid alone or in combination with acetic acid may be diluted with alcohol and used as the reaction medium. However, the preferred process is to carry out the subject reaction in the presence of at least a molecular equivalent of water. A large excess of water, however, should not be used since it would tend to slow the rate of reaction.

The concentration of nitrile to chloride in the process of this invention may vary from a mol ratio of 1:3 to 3:1 or higher. Obviously, if both reactants have the same number of functional groups, then generally a 1:1 mol ratio within ±10% may preferably be used.

It has been found, in general, that strong acids are useful as catalysts in the process of this invention. Examples of satisfactory acids suitable for purposes of this invention are sulfuric acid, benzene sulfonic acid, toluene sulfonic acid, phosphoric acid, alkane sulfonic acids, formic acid, or a mixture of various acids such as a mixture of sulfuric and acetic acids, or a mixture of sulfuric and phosphoric acids. The acids catalyst may very conveniently be used as the reaction medium. A preferred reaction medium is a mixture of sulfuric and acetic acids ranging in concentration from a composition of 25% sulfuric acid and 75% acetic acid up to fuming sulfuric acid.

Usually, it is not necessary to heat the reagents, since the reaction generally takes place spontaneously with more or less evolution of heat. In some cases, however, where less active reactants or weaker acid catalysts such as formic acid are employed, heating is necessary. The reaction may be carried out in the range of −20° C. or lower up to 100° C. or higher with the range 20° C.–40° C. being preferred. External cooling of the reaction mixture should be employed where volatile reactants are used or where the nature of the reactants is such that external cooling seems indicated.

The time of reaction required has been found to vary somewhat according to the particular tertiary alkyl chloride or nitrile used, although a few hours are sufficient to substantially complete the reaction in most cases. The particular acid medium in which the reaction takes place may also increase or decrease the time necessary for complete reaction. In some cases a very short period, about 2 hours or less, is sufficient, although in the case of less reactive ingredients, this time of reaction may run up to as much as 1 or 2 days or more.

The order in which the reactants are mixed is not important and may be varied to suit the particular case in hand. It has been found advantageous, however, in most cases to mix or dissolve the tertiary alkyl chloride in the nitrile first and then add this mixture to the acid solvent. This, however, is not an essential step in the process and merely constitutes a convenient method for adding the chloride and nitrile in equivalent amounts. It will normally not be necessary to use an additional solvent since a large number of tertiary alkyl chlorides form a compatible solution with nitriles and dissolve completely. The concentration of the reactants in the acid may be from between 2–40% by weight with the range of 10–20% preferred.

The amides of this invention may be prepared in reactors constructed of or lined with glass, porcelain, enamel, silver, gold, platinum, etc., the main requirement being, of course, that the acid used as catalyst should not react with the reactor material. This is rather important since certain metal salts have a tendency to produce an off-colored product and may in fact inhibit the reaction.

The following specific examples wherein are set forth preferred embodiments, further illustrate the principles and practice of this invention. Parts and percentages are by weight unless otherwise indicated.

*Example I*

A solution of 51.5 parts of benzonitrile, 46.2 parts of tert-butyl chloride and 120 parts of 90% formic acid is heated with refluxing for 4 hours. The solution is then poured into a mixture of water and ice. The precipitated solid is filtered and consists of 34.5 parts of N-tert-butyl benzamide melting at 133–134° C. The yield is 39%.

*Example II*

A mixture of 5.4 parts of adiponitrile (0.05 mol), 9.25 parts of tert-butyl chloride (0.1 mol) and 24 parts of 90% formic acid is heated with refluxing for 5 hours. After pouring into ice and water, the precipitate is filtered, dried and yields 1.2 parts of di-N-tert-butyl adipamide (10% yield) melting at 208–210° C.

*Example III*

4.62 parts tert-butyl chloride and 5.2 parts benzonitrile are mixed with 43 parts 80% sulfuric acid. After standing overnight at room temperature, the mixture is poured into ice and water and N-tert-butyl benzamide is isolated by filtration. The yield is 1.4 parts (16%).

*Example IV*

A mixture of 11.7 parts benzyl cyanide, 9.25 parts of tert-butyl chloride and 24 parts 90% formic acid is heated with refluxing for 5 hours and poured into a mixture of ice and water. The solid which precipitates is filtered and dried and the yield is 4.3 parts of N-tert-butyl-phenyl acetamide (23% yield). The amide melts at 111–113° C. and analyzes 7.25% nitrogen (calculated 7.34%).

The following example demonstrates a process of this invention when it is desired to utilize both functional groups of one of the reactants, in this case 2,11-dichloro-2,11-dimethyl dodecane.

*Example V*

A mixture of 2.67 parts of 2,11-dichloro-2,11-dimethyl dodecane,[1] 1.08 parts of adiponitrile and 4.8 parts of 90% formic acid is heated with refluxing and stirring for 5 hours. The solution is then poured into ice and water. The polymer separates as a highly viscous, sticky liquid.

The organic amides and diamides containing a tertiary carbon atom attached to the nitrogen of the amido group are useful as solvents, plasticizers, glycerine substitutes, resin intermediates, etc. Of course, the synthetic linear polyamides formed when difunctional reactants are used are useful in all the many ways that have been described in the prior art to include formation into textile yarns by wet-, dry-, or melt-spinning processes as well as to make rods, bristles, sheets, foils, ribbons, films and the like. They are also useful in connection with various blending agents, such as resins, plasticizers, cellulose derivatives, etc., to form coating compositions, lacquers, molded articles, and other such materials. When it is desired to form polyamides by the process of this invention, a most important advantage accrues, viz., room temperature polymerization. This low temperature polymerization is obviously much more attractive commercially than the melt polymerization process of the prior art.

As many widely different embodiments can be made without departing from the spirit and scope of my invention, it is understood that said invention is in no wise restricted except as set forth in the appended claims.

I claim:

1. A process for preparing amides which comprises reacting an organic nitrile having a formula selected from the group consisting of H—$R_m$—CN and NC—$R_m$—CN, where R is selected from the group consisting of bivalent hydrocarbon and nitro and amino substituted hydrocarbon radicals, and $m$ is a numeral from 0 to 1, and water with a tertiary chloride selected from the group consisting of tertiary alkyl chlorides and ditertiary alkylene dichlorides in a strong acid reaction medium.

2. A process for preparing amides which comprises reacting substantially molecular equivalents of an organic nitrile having a formula selected from the group consisting of H—$R_m$—CN and NC—$R_m$—CN, where R is selected from the group consisting of bivalent hydrocarbon and nitro and amino substituted hydrocarbon radicals, and $m$ is a numeral from 0 to 1, and water with a tertiary alkyl chloride in a strong acid reaction medium.

3. The process of claim 2 wherein the nitrile and tertiary alkyl chloride comprises from 2 to 20% by weight of the initial reaction mixture.

4. A process for preparing an amide which comprises reacting substantially molecular equivalents of benzonitrile and water with tertiary butyl chloride in a strong acid reaction medium.

5. A process for preparing an amide which comprises reacting substantially molecular equivalents of adiponitrile and water with tertiary butyl chloride in a strong acid reaction medium.

6. A process for preparing an amide which comprises reacting substantially molecular equivalents of benzyl cyanide and water with tertiary butyl chloride in a strong acid reaction medium.

7. A process for preparing amides which comprises reacting substantially molecular equivalents of an organic nitrile having a formula selected from the group consisting of H—$R_m$—CN and NC—$R_m$—CN, where R is selected from the group consisting of bivalent hydrocarbon and nitro and amino substituted hydrocarbon radicals, and $m$ is a numeral from 0 to 1, and water with a ditertiary alkylene dichloride in a strong acid reaction medium.

8. The process of claim 7 wherein the nitrile and the ditertiary alkylene dichloride together comprise from 2 to 20% by weight of the initial reaction mixture.

9. A process for preparing an amide which comprises reacting substantially molecular equivalents of adiponitrile and water with 2,11-dichloro-2,11-dimethyl dodecane in a strong acid reaction medium, where said adiponitrile and 2,11-dichloro-2,11 dimethyl dodecane together comprise from 2 to 20% by weight of the initial reaction mixture.

EUGENE EDWARD MAGAT.

No references cited.

---

[1] 2,11-dichloro-2,11-dimethyl dodecane prepared according to J. Am. Chem. Soc. 70, 479 (1948).